United States Patent Office 3,594,317
Patented July 20, 1971

3,594,317
WELL DRILLING METHOD USING DECANOL IN PLACE OF OIL IN AQUEOUS DRILLING FLUIDS
Jack C. Estes and Arthur Park, Tulsa, Okla., assignors to Pan American Petroleum Corporation, Tulsa, Okla.
No Drawing. Filed Nov. 12, 1969, Ser. No. 876,115
Int. Cl. C01m 3/16
U.S. Cl. 252—8.5C        9 Claims

ABSTRACT OF THE DISCLOSURE

Normal, primary decanol is used in water-based, clay-containing drilling fluids as a replacement for oil to decrease friction of the drill string and flowing drilling fluid and to reduce the tendency of the drill pipe to stick to the well wall due to higher pressures in the well than in the formation. Preferably, the alcohol is pure, synthetic decanol. It can be used as blends with other liquids such as other alcohols.

BACKGROUND OF THE INVENTION

This invention pertains to drilling fluids or "drilling mud" used in the rotary drilling of oil wells. The drilling fluid serves to cool and lubricate the drill bit, raise drilled cuttings to the surface, seal the sides of the well with a filter cake to prevent loss of drilling fluids into the formation through which the drill hole is being bored, and stabilize the borehole until casing can be set into it. The drilled cuttings are separated from the drilling fluid at the surface. The drilling fluid is then recirculated. The drilling mud generally is an aqueous-base material incorporating therein bentonite clay or the drilled solids material to achieve proper weight, viscosity and fluid-loss characteristics. Oils, particularly diesel oil (mixed paraffin hydrocarbons) and so-called "No-Glo" oil (normal paraffin hydrocarbons) have been used in drilling muds for a variety of reasons. Not only does oil reduce mud weight and increase penetration rate, but also reduces fluid loss, torque and drag on the rotating drill string, and differential sticking tendency of drill pipe in the filter cake. The need becomes intensified with the drilling of deeper wells into permeable formations which are common in offshore operations. Differential sticking of the drill pipe occurs where the hydrostatic mud pressure is substantially higher than the formation fluid pressures encountered, wherein a mud cake forms opposite the permeable section of the hole and a flow of filtrate passes through the mud cake and into the formation. As a result, the filter cake begins to thicken but more importantly a pressure differential from the well bore to the permeable formation occurs which can actually hold the pipe against the well wall with great force. This phenomenon is explained in U.S. Pat. No. 3,328,295 of James L. Lummus and Arthur Park, and depends upon a number of factors.

In addition, especially in wildcat wells, the needs for geological evaluation of the drilled cuttings is of absolute importance. Where oil is used in the drilling fluid, the samples become contaminated to such an extent that geological evaluation is not possible.

Further, with the advent of tighter anti-pollution regulations concerning the use of oil in drilling mud especially in offshore operations, it has become necessary to find materials, other than oil, which will provide the attributes of oil in drilling mud. Regulations now exist from the Department of the Interior and the various regulatory bodies of the states with offshore oil fields. These regulations prevent the economical use of drilling muds containing free oil. However, when oil is not added, the chance of differential sticking of the drill pipe is greatly increased, and the cost of drilling may become high due to fishing operations for stuck pipe.

SUMMARY

This invention provides the use of normal, primary, decanol, especially substantially pure n-decyl alcohol ($C_{10}$) which, when added to an aqueous-base mud, overcomes the problems set forth above. The base mud applicable to this invention is aqueous with added bentonite clays or native clay solids and is either a low-solids (non-dispersed) or dispersed mud system.

The normal, primary long-chain alcohols have two characteristics which make them attractive to use. First, they do not fluoresce under ultraviolet light, which aids in well-site geological evaluation of the rock cuttings; and, second, they are used in extremely small concentrations and are biodegradable, due to their straight chain, which satisfies anti-pollution regulations. Since they are used in such low concentrations, they usually do not lower the fluid loss of a mud as addition of oil would do. In fact, one advantage is that they do not change any of the properties normally tested by mud engineers. They solve the problems normally solved by oil without greatly affecting mud properties.

In general, it has been found that only 0.1 percent to 0.2 percent by volume of the alcohol is necessary to achieve reduction in differential sticking that ordinarily required 4 percent to 8 percent by volume diesel oil or other oil materials. In practical use, concentration ranges from about 0.05 to about 2.0 pounds per barrel, preferably .5 pound per barrel. As a result, a drilling fluid has been discovered which is capable of reducing differential sticking tendencies of the drill pipe, and reducing torque and drag on the drill string while drilling, yet satisfies both anti-pollution and geological evaluation requirements. Typical of the preferred alcohol is that manufactured by Continental Oil Company and sold under the trademark "Alfol 10."

The invention is better understood by considering the following tests and examples.

Example

A test was conducted during the rotary drilling of a well in Louisiana. The rig had an independent rotary engine driven through a torque converter and the engine was operated at full throttle all the time. Thus, any increase in rotary speed could be attributed to decreased drill string torque. The pump was operated through torque converters with engines at full throttle also. Substantially pure (99 percent) normal, primary, synthetic alcohol of ten carbon chain length ($C_{10}$) was added initially to the 400-barrel pit volume at a depth of 8,800 feet in a 9⅞ inch hole. Concentrations, believed to be in excess of that necessary, were added during the next three hours to about ¾ pound per barrel. The average rotary speed increased from 147 r.p.m. to 175 r.p.m. indicating a 19 percent reduction of torque on the drill string. It was also found that up to twice as much weight could be applied to the bit without causing the rotary speed to slow down. The average mud flow rate before adding the alcohol was 389 g.p.m. at 2,450 p.s.i. After adding the alcohol, the average flow rate increased to 417 g.p.m. with a lower pump pressure of 2,238 p.s.i. This improvement in the drilling variables allowed for a 52 percent increase in penetration rate in the 523 feet after the alcohol was added as compared to 374 feet before. These values are best shown in Table I below:

TABLE I

| Depth | Time | R.p.m. | Weight, thousands of pounds | P.s.i. | G.p.m. |
|---|---|---|---|---|---|
| BEFORE ADDING C₁₀, BIT NO. 5 | | | | | |
| 8,412 | 8:00 AM | [1] 115 | 40 | 2,600 | 396 |
| 8,466 | 9:00 AM | 132 | 36 | 2,450 | 382 |
| 8,537 | 10:00 AM | 144 | 31 | 2,450 | 382 |
| 8,589 | 11:00 AM | 164 | 35 | 2,450 | 386 |
| 8,645 | 12:00 PM | 144 | 30 | 2,450 | 386 |
| 8,696 | 1:30 PM | 156 | 32 | 2,450 | 376 |
| 8,716 | 2:30 PM | 156 | 28 | 2,300 | 386 |
| 8,778 | 4:30 PM | 152 | 31 | 2,450 | 404 |
| 8,786 | 5:00 PM | 160 | 34 | 2,450 | 404 |
| 374'/9 hrs.[2] (41.5 ft./hr.)[2] | | [2] 147 | [2] 33 | [2] 2,450 | [2] 389 |
| AFTER ADDING C₁₀, BIT NO. 6 | | | | | |
| 8,818 | 2:30 AM | 188 | 23 | 2,300 | 422 |
| 8,828 | 3:00 AM | 172 | 26 | 2,300 | 414 |
| 8,814 | 3:30 AM | 180 | 26 | 2,300 | 422 |
| 8,886 | 4:00 AM | 184 | 33 | 2,300 | 422 |
| 8,901 | 4:30 AM | 168 | 36 | 2,250 | 422 |
| 8,945 | 5:00 AM | 176 | 35 | 2,250 | 422 |
| 9,008 | 5:30 AM | 176 | 35 | 2,275 | 422 |
| 9,073 | 6:00 AM | 172 | 36 | 2,275 | 430 |
| 9,152 | 8:00 AM | [3] 176 | [3] 45 | 2,050 | 396 |
| 9,226 | 9:00 AM | [3] 160 | [3] 60 | 2,175 | 405 |
| 9,341 | 10:45 AM | [3] 172 | [3] 60 | 2,150 | 414 |
| 523'/8.25 hrs.[2] (63.3 ft./hr.)[2] | | [2] 175 | [2] 38 | [2] 2,238 | [2] 417 |
| | | [4] 52 | [4] 19 | [4] 15 | [4] 8.7 | [4] 7 |

[1] Notice that at 40,000 pounds weight on bit, the rotary slowed down to 115 r.p.m. indicating excessive drill string torque; weight had to be run between 30–35 thousand pounds to maintain a reasonably high r.p.m.
[2] Averages.
[3] It was discovered that the C₁₀ alcohol had lubricated the annulus so that much higher weights on bit could be applied without loss in rotary speed.
[4] Percent improvement.

Certain shale formation studies were being conducted by a research geologist at this same well. It was found that the infraded and gas chromatographic analysis of the benzene extracts from the drilled cutting samples did not detect the presence of non-idigenous material in any of the samples and there was no interference by the alcohol on the source rock measurements. Heretofore, the source rock quality could not be correlated because of contamination when diesel oil or other oil-type drilling mud additives were used.

Although substantially pure $C_{10}$ alcohol is preferred, in certain situations it may be more suitable to the drilling situation or climate to use suitable alcohol blends of $C_{10}$ alcohol with alcohols having lower or higher carbon length chain. Suitable alcohol mixtures are, for example, 20 percent $C_6$, 35 percent $C_8$, 44 percent $C_{10}$, plus 1 percent impurities, or, in other instances, a blend of 44 percent $C_8$ and 55 percent $C_{10}$ with 1 percent impurities. The reason blends of the lower chain-length alcohols are used is to lower the freezing point of the alcohol so that it will be easier to use in cold weather. Other low-melting liquids, such as ethyl acetate, can also be used to dilute the decanol and lower the freezing point. The lower molecular weight alcohols, such as octanol and hexanol, are preferred, however. When using such diluted blends of decanol, sufficient of the blend should be used to give the desired concentration of decanol in the drilling fluid independent of the diluent. Even the other alcohols, such as octanol, have little, if any, effects as oil substitutes. Once the decanol is in the drilling fluid, it remains liquid, since the temperature of the drilling fluid circulating in the well is far above the 39° F. freezing point of the decanol.

Whenever possible, it is best to use the decanol in its pure form. This avoids foaming problems, which may be caused by the other alcohols. Higher molecular-weight alcohols are the worst foamers, but even octanol causes foams in many cases. Decanol seems to have less tendency to cause foams than the pure alcohols of either higher or lower molecular weights. Impure, naturally-occurring decanol can be used, if desired, but the pure form is preferred.

The freezing points of various blends of pure $C_{10}$ and $C_8$ are given below in Table II.

TABLE II

| Volume, percent | | Freezing point, ° F. |
|---|---|---|
| $C_{10}$ | $C_8$ | |
| 60 | 40 | 12 |
| 70 | 30 | 19 |
| 80 | 20 | 23 |
| 90 | 10 | 32 |
| 95 | 5 | 37 |
| 100 | 0 | 39 |

Hence, the drilling location, e.g., Alaska or Gulf of Mexico coast, may dictate the desired blend.

It is believed that when normal, primary, long-chain alcohols of the type contemplated here are added to mud systems in a liquid form, they do not emulsify as do regular hydrocarbon oils, but concentrate at liquid-solid interfaces. That is, the alcohol tends to concentrate at the mud solids-water interface, the mud-drill pipe interface, and the mud-formation interface within the annulus. Thus, the differential sticking reduction observed in laboratory tests and the significant reduction in torque observed in the above example are the result of lubrication provided by the alcohol between the drill pipe and the filter cake on the wall of the well. This same characteristic appears to account for the reduction in pressure drop down the drill string allowing more fluid to be pumped at a lower pressure. This characteristic of the alcohol to become concentrated at interfaces also provides us with a practical visual basis for the necessary amount of alcohol in a mud system. When the filter cakes of muds containing an adequate amount of alcohol are washed, they have a water-repellent surface in contrast to the water-wet surface of a normal filter cake. Hence, this simple test procedure can be used to determine if required minimum concentrations are being maintained.

Early prior artisans have taught certain alcohols as anti-foaming or anti-gas cutting agents in drilling fluids. Examples include U.S. Pats. 1,999,147, 2,209,591, and 2,271,695. However, these alcohols were available from natural sources and were actually blends of several alcohols. Commercial quantities of 99 percent pure alcohols have become available recently with the synthesis of these alcohols.

None of the prior-art references suggests the ability of normal, primary decanol to decrease differential sticking, lubricate the drill string, and increase the flow of drilling fluid in the well, and, in general, perform the functions of oil without the pollution problems presented by oil. It is true that if the alcohol is present to solve gas-cutting problems, it also inherently solves the other problems. When there are no gas-cutting problems, however, the alcohols would not be used in accordance with the prior-art teaching. Thus, if there is little gas in the mud at the pump suction, there is nothing in the prior art to suggest use of the alcohols. If the density of the mud at atmospheric pressure is decreased by no more than about 0.5 pound per gallon by gas in the mud, the gas-cutting problem certainly is not sufficiently serious to require the use of chemicals, such as alcohols in the mud, to relieve the problem. About 300 feet down the well, the hydraulic head of mud alone is sufficient to compress the gas to one-tenth its volume at the surface. Therefore, if the density is decreased by 0.5 pound per gallon at the surface, the density will be reduced by only 0.05 pound per gallon at a depth of about 300 feet. Obviously, such a small decrease in mud density is not sufficiently serious to require treatment for gas cutting. The amount of density decrease due to gas at the surface can be easily determined by measuring the density before and after evacuating to remove the gas.

In addition, it should be noted that if the mud is gas cut, it is treated as the mud comes from the well and flows to the mud pits. If the mud is to be treated to reduce friction and to decrease sticking of drill pipe in the well, however, it is usually treated at the pump suction where other mud-building additives are introduced. It is possible, of course, to treat the mud at other points to reduce friction and decrease differential sticking of the drill pipe. It is preferred, however, to treat at the mud-pump suction.

The abilities of the various alcohols to prevent differential sticking of the drill pipe are shown in Table III. In the reported tests, a field mud was used which had been found to have very little foaming tendency. In fact, this particular mud did not foam even with the alcohols of higher molecular weight than decanol. Thus, it was possible to check the differential-sticking effects without the complicating factor of foam formation, which can give misleading results in the test. In the test, the mud is poured into the top of a Büchner funnel, having a sintered filter element. A vacuum is applied to the lower side of the filter element during the entire test. After the mud has been in the funnel for ten minutes, a cylindrical object about 0.75 inch in diameter and 1.5 inches long is dropped from a height of about 1 inch above the filter element so the cylindrical surface strikes the filter cake which has built up. After five more minutes, the cylinder is pulled away from the filter cake by means of a rod attached to the opposite side of the cylinder from that embedded in the filter cake. The pull is exerted through a maximum reading gauge which records the maximum pull required to release the cylinder from the filter cake. Tests are run in quadruplicates and the results are average after discarding any results which are obviously in error.

TABLE III

| Alcohol chain-length: | Differential sticking reduction, percent |
|---|---|
| C-6 | None |
| C-8 | None |
| C-9 | None |
| C-10 | 22 |
| C-12 | 7 |
| C-14 | None |
| C-16 | None |
| C-20 | 3 |
| 20% C-4, 40% C-10, 40% C-20 blend | 8 |
| 5% diesel oil | 15 |

The concentration of alcohol was one-half pound per barrel. The results show rather clearly the unique nature of decanol. The test with the alcohol blend provided about the results which could be expected from the decanol content alone.

It appears that the alcohol additive taught in this invention is a substantial aid in lignite and asphalt dispersion when these materials are added to the mud system for hole stability or fluid-loss control. Because decanol coats the pipe with an oily film, it has some tendency to protect the pipe from corrosion.

While decanol is obviously unique as a mud additive for our purposes, several variations and alternates have been described as far as diluents and also methods of use are concerned. Still other alternates and variations will occur to those skilled in the art. Therefore, we do not wish to be limited to the examples given but only by the following claims.

We claim:
1. In a method for drilling a well in which an aqueous drilling fluid containing clay is circulated in the well, and in which the drilling fluid at the mud-pump suction contains not more than enough gas to decrease the density by about 0.5 pound per gallon at atmospheric pressure, the improvement comprising mixing into said drilling fluid before it enters the well sufficient normal, primary decanol to provide a concentration of from about 0.05 to about 2.0 pounds of said alcohol per barrel of drilling fluid.

2. The method of claim 1 in which said alcohol is synthetic, normal, primary decanol.

3. The method of claim 1 in which said decanol is diluted with a low-freezing point liquid selected from the group consisting of ethyl acetate, hexanol and octanol with which the decanol is miscible to reduce the freezing point of the additive.

4. The method of claim 3 in which said diluent is octanol.

5. The method of claim 1 in which the concentration of said decanol in said drilling fluid is about 0.5 pound per barrel.

6. A method for reducing the friction of the drill string and of flowing drilling fluid in a well and for decreasing the tendency of the drill pipe to stick against the well wall during drilling operations comprising circulating in said well past the drilled formations during the drilling operation an aqueous clay-containing drilling fluid having from about 0.05 to about 2.0 pounds of normal, primary decanol per barrel of said drilling fluid and said drilling fluid containing less than enough gas to decrease the density of the drilling fluid by about 0.5 pound per gallon at atmospheric pressure.

7. An aqueous clay-based drilling fluid having from about 0.05 to about 2.0 pounds of normal, primary decanol per barrel of said drilling fluid and said drilling fluid containing less than enough gas to decrease the density of the drilling fluid by about 0.5 pound per gallon at atmospheric pressure.

8. A drilling fluid of claim 7 wherein said clay is bentonite.

9. A drilling fluid according to claim 7 wherein the alcohol is a synthetic $C_{10}$ alcohol.

References Cited

UNITED STATES PATENTS

| 2,094,127 | 9/1937 | Lazier | 252—52 |
| 2,209,591 | 7/1940 | Barnes | 252—8.5 |
| 2,271,696 | 2/1942 | Jones | 252—8.5 |
| 3,047,493 | 7/1962 | Rosenberg | 252—8.5 |
| 3,410,797 | 11/1968 | Walker et al. | 252—8.5 |

HERBERT B. GUYNN, Primary Examiner

U.S. Cl. X.R.

252—8.5P